United States Patent [19]

Leiby et al.

[11] Patent Number: 4,669,874
[45] Date of Patent: Jun. 2, 1987

[54] BORESCOPE CALIBRATION

[75] Inventors: David W. Leiby; Joseph C. Young, both of Cincinnati, Ohio

[73] Assignee: General Electric Company, Cincinnati, Ohio

[21] Appl. No.: 674,384

[22] Filed: Nov. 23, 1984

[51] Int. Cl.$^4$ ............................................. G01M 11/00
[52] U.S. Cl. .................................... 356/124.5; 356/241
[58] Field of Search .................. 356/124, 124.5, 127, 356/241, 243, 244

[56] References Cited
U.S. PATENT DOCUMENTS 3,630,618 12/1971 Jacoby ................................ 356/241

OTHER PUBLICATIONS

Franz, *Industrial Photography*, vol. 22, No. 2, Feb. 1973, p. 34.
Lindberg, *J. Opt. Soc. Am.*, vol. 42, No. 10, Oct. 1952, p. 748.
Coleman et al., *J. Opt. Soc. Am.*, vol. 37, No. 4, Apr. 1947, p. 263.
Gardner et al., Research Paper RP984, *J. Res. of Nat. Bur. Stand.*, vol. 18, Apr. 1937, p. 449.

*Primary Examiner*—F. L. Evans
*Attorney, Agent, or Firm*—Derek P. Lawrence

[57] ABSTRACT

In the present invention, a support positions a target within the field of view of the borescope. The target is in the focal plane of the borescope and contains a series of parallel images of progressively finer detail. The image having the finest detail which is detectable by the borescope gives a measure of the borescope's resolving power.

1 Claim, 3 Drawing Figures

BORESCOPE CALIBRATION

The United States Government has rights in this invention pursuant to Contract F33657-81C-2006 awarded by the Department of the Air Force.

BACKGROUND OF THE INVENTION

FIG. 1 illustrates a borescope 3 being used to examine an internal component 6 in a gas turbine engine 8 which would otherwise be hidden from view. Such a borescope 3 generally includes a tube 9, which supports a lens system including lenses 12, 14 and 16 and also possibly a prism 18 for viewing in a region which lies off the optical axis of the borescope.

Borescopes, during their lifetimes, suffer abuse inflicted by the following factors.
  (1) Mechanical shock, which can crack lenses or prisms, dislodge lenses and prisms from their original positions, or scratch the lenses and prisms.
  (2) Fogging of optical elements of the borescope resulting from
    (a) outgased vapors released by the adhesives used to hold the optical elements in position when the adhesives are subject to overheating;
    (b) degradation of anti-reflective coatings on the optical elements caused by excessive temperature or excessive radiation; and
    (c) contamination of the optical elements by accidental spillage of solvents or other contaminants.
  (3) Mechanical deformation which deforms the borescope tube 9 and misaligns the optical elements.

One or more of the above types of damage can be suffered by a borescope, yet a degradation in the optical performance of the borescope may not be apparent to a human operator. For example, the borescope may be rendered incapable of detecting a defect below a certain size, yet the borescope may appear to be functioning perfectly well.

OBJECTS OF THE INVENTION

It is an object of the present invention to provide an apparatus for measuring the optical performance of a borescope.

SUMMARY OF THE INVENTION

In one form of the present invention, a support positions a target within the field of view of the borescope. The target is in the focal plane of the borescope and contains a series of parallel images of progressively finer detail. The image having the finest detail which is detectable by the borescope gives a measure of the borescope's resolving power.

DETAILED DESCRIPTION OF THE INVENTION

Applicants have found that the three types of borescope defects described in the Background of the Invention all have a common feature: they all effect the resolving power of the borescope.

Figure 1:
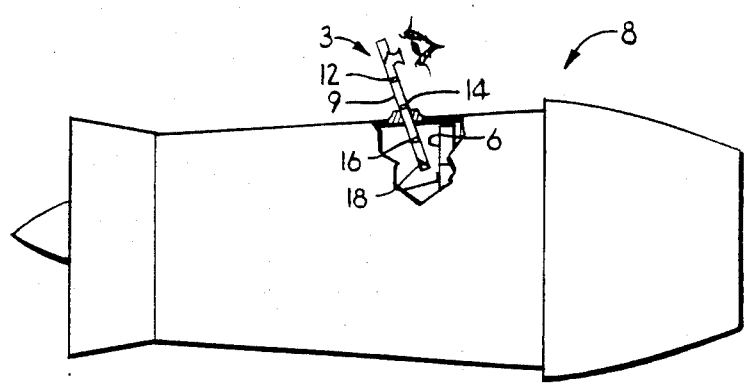
FIG. 1 illustrates a borescope 3 being used to inspect an internal component 6 of a gas turbine engine 8.
Figure 2:
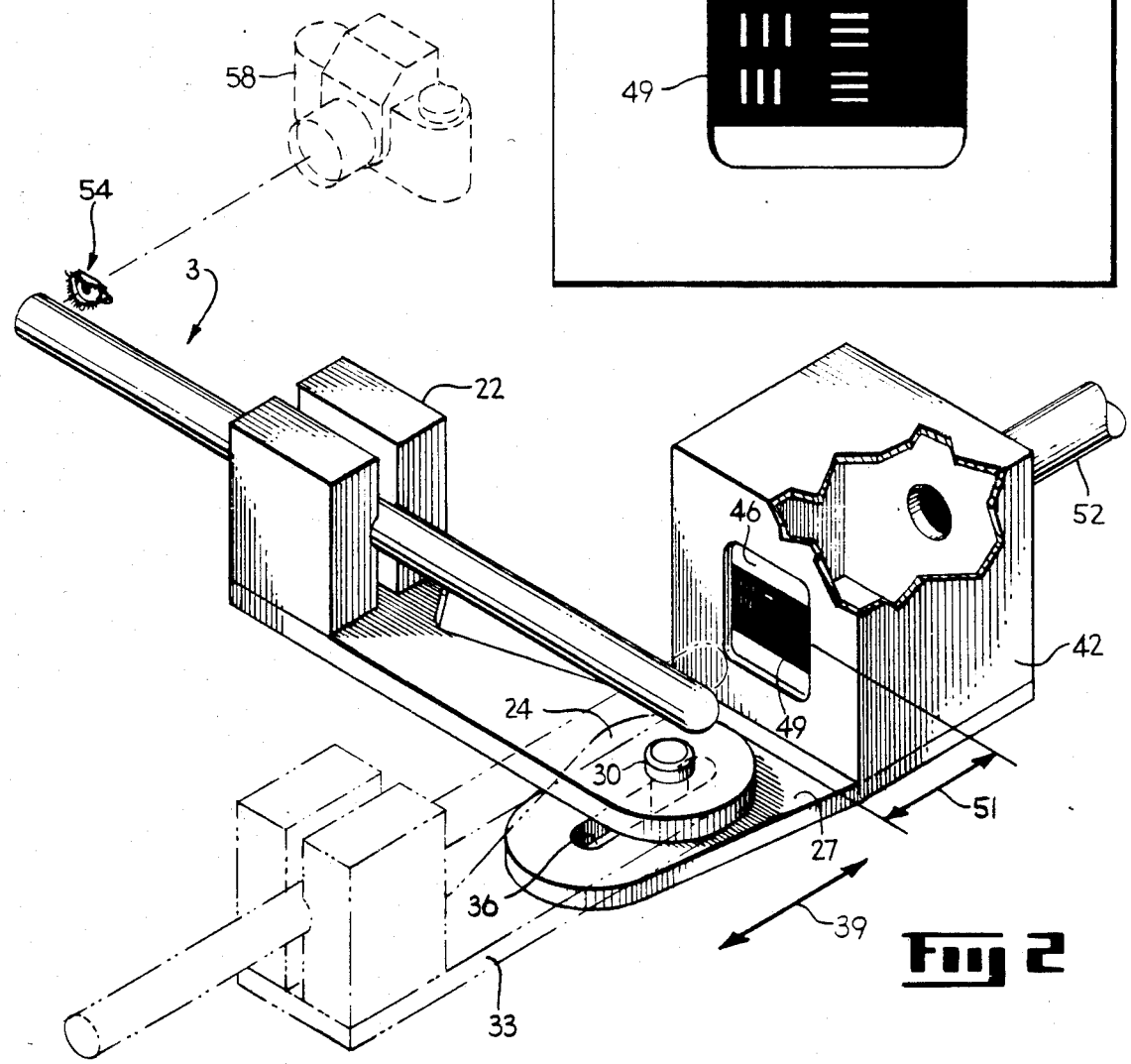
FIG. 2 illustrates one form of the present invention.

As shown in FIG. 2, a borescope 3 is supported by a clamp 22 which is in turn supported by a stage 24. The stage 24 is supported by a stage support 27, by means of a pivot pin 30 such that the stage 24 can rotate about the pivot pin 30 and occupy selected positions, such as phantom position 33. The stage support 27 contains a slot 36 along which the pivot pin 30 can slide in the direction of arrows 39 for a purpose to be later described. Also supported by the stage support 27 is a light box 42 which is optically sealed from ambient light. The light box 12 contains a window 46 of frosted glass and against the frosted glass window 46 is positioned a target 49. The target 49 is preferably a United States Air Force 1951 resolving power target, and is available from Metrigraphics Division of Dynamic Research Corporation of Wilmington, Massachusetts. The frosted glass window 46, as well as the target 49 are illuminated by a flexible light guide 52 (not fully shown) such as one provided by the manufacturer of the borescope 3 in FIG. 1. The light guide 52 is preferably the same one used to illuminate the component 6 in FIG. 1, and is available from, for example, Wolfe Medical Instruments, Rosemont, Illinois.

Figure 3:
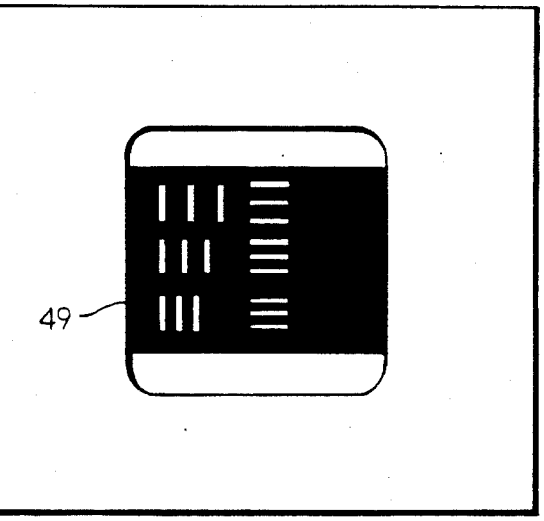
FIG. 3 illustrates the target 49 of FIG. 2.

As shown in FIG. 3, the target 49 contains a collection of slits of increasing fineness. The slits are actually rectangles which are cut or photographically generated in an opaque background region. The apparatus of FIG. 2 is used to calibrate a borescope 3 as follows.

First, the pivot pin 30 is moved to a position along the direction of arrows 39 such that the target 49 is in the focal plane of the objective lens (not visible) of the borescope. That is, distance 51 is adjusted to become the focal distance. The pivot pin 30 is then locked in place against the stage support 27, as by using a locknut which compresses a belleville spring on the underside of the stage support 27. (The lock washer and the belleville spring are not specifically shown.) The operator then looks through the borescope 3, as indicated by the eye 54. The operator selects the group of figures in the target 49 having the closest spacing which he can discern through the borescope. That is, he selects the group which is next to the group in which the rectangles are blurred together and no spacing is visible between them.

The present invention has several important features.
(1) The resolution measurement need not be taken at only one point within the field of view of the borescope, but can be taken at all points within the field of view. For example, the borescope 3 in FIG. 2 can be repeatedly positioned such as at the position shown in solid lines and at phantom position 33, as well as all positions therebetween, in order to measure the resolution of the borescope at all points within the field of view.
(2) The slot 36 in FIG. 2 allows borescopes of different focal length to be calibrated by the present invention by moving the pivot pin 30 in the directions of arrows 39.
(3) The ability of the stage 24 to rotate about the pivot pin 30 allows borescopes of different angles of view to be calibrated. For example, borescope 3 has a right angle of view, while another borescope (not shown) may have a direct, zero angle of view.

An invention has been described for detecting the resolving power of a borescope. Numerous substitutions and modifications can be undertaken without departing from the true spirit and scope of the present invention. For example, the invention is not limited to the testing of borescopes, but can be used to calibrate endoscopes as well. As a second example, it is possible that the resolving power of the borescope may exceed that of the operator's eye. In such case, the borescope will present a clear image of a finer grouping of slits in FIG. 3 than the operator will be able to see. In such a case, the operator's eye 54 in FIG. 2 can be replaced by a phantom camera 58. The camera takes a photograph of the target 49, and the operator makes a photographic enlargement and uses the enlargement to discern the finest grouping of images that the borescope can resolve.

As a third example, the slot 36 in FIG. 2 need not be provided. The apparatus of FIG. 3 can be constructed with a fixed distance 51 defined between the borescope 3 and the target 49. Such a construction would be suited to one borescope of a given focal length. This fixed distance 51, if fixed at one inch, would meet the testing criterion now commonly used and proposed to be standarized by an SAE Borescope Committee.

What is desired to be secured by Letters Patent of the United States is the invention as defined in the following claims.

We claim:

1. Apparatus for calibrating a borescope, consisting of:
   (a) a stage for supporting the borescope;
   (b) a stage support for supporting the stage and containing a slot;
   (c) a light box supported by the stage support for supporting and illuminating a resolving power target; and
   (d) pivot pin means for connecting the stage to the slot in the stage support for
      (i) allowing the stage to be positioned at a selected distance from the resolving power target, and
      (ii) allowing the borescope to view the resolving power target from different angles.

* * * * *